US009449729B2

(12) United States Patent
Schulz-Dobrick et al.

(10) Patent No.: US 9,449,729 B2
(45) Date of Patent: Sep. 20, 2016

(54) PROCESS FOR PRODUCING ELECTRODE MATERIALS

(75) Inventors: Martin Schulz-Dobrick, Mannheim (DE); Bastian Ewald, Ludwigshafen (DE); Jordan Keith Lampert, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 1229 days.

(21) Appl. No.: 13/236,699

(22) Filed: Sep. 20, 2011

(65) Prior Publication Data

US 2012/0068128 A1 Mar. 22, 2012

Related U.S. Application Data

(60) Provisional application No. 61/384,725, filed on Sep. 21, 2010.

(51) Int. Cl.

*H01B 1/02* (2006.01)
*H01M 4/13* (2010.01)
*H01B 1/08* (2006.01)

(52) U.S. Cl.

CPC .................................... *H01B 1/08* (2013.01)

(58) Field of Classification Search

CPC ........ H01M 6/16; H01M 10/40; H01M 2/16; H01M 2/1653; H01M 4/62; H01M 4/622; C01G 53/00
USPC .................. 252/182.1; 429/231.1, 224, 232; 423/594.6, 599, 594.4
See application file for complete search history.

(56) References Cited

U.S. PATENT DOCUMENTS

| | | | | |
|---|---|---|---|---|
| 6,096,447 | A * | 8/2000 | Gan et al. | 429/3 |
| 6,733,927 | B1 | 5/2004 | Takezawa et al. | |
| 2002/0136956 | A1* | 9/2002 | Gan et al. | 429/232 |
| 2009/0286157 | A1 | 11/2009 | Chen et al. | |
| 2010/0136412 | A1 | 6/2010 | Watanabe | |
| 2011/0206990 | A1* | 8/2011 | Akagi et al. | 429/231.1 |

FOREIGN PATENT DOCUMENTS

| | | | |
|---|---|---|---|
| CN | 101160684 | A | 4/2008 |
| CN | 101164187 | A | 4/2008 |
| CN | 101707251 | A | 5/2010 |
| CN | 101789520 | A | 7/2010 |
| JP | 2002-270184 | A | 9/2002 |
| JP | 2002-352804 | A | 12/2002 |
| JP | 2006-139945 | A | 6/2006 |
| JP | 2007-018828 | A | 1/2007 |
| JP | 2009-193780 | A | 8/2009 |
| WO | WO 00/76016 | | 12/2000 |
| WO | WO 2010/040950 | | 4/2010 |

OTHER PUBLICATIONS

U.S. Appl. No. 13/302,007, filed Nov. 22, 2011, Schulz-Dobrick, et al.
U.S. Appl. No. 13/302,370, filed Nov. 22, 2011, Schulz-Dobrick, et al.
International Search Report issued Jan. 27, 2012, in PCT/EP2011/066300 (with English Translation of Category of Cited Documents).
Q. Y. Wang, et al., "High capacity double-layer surface modified $Li[Li_{0.2}Mn_{0.54}Ni_{0.13}Co_{0.13}]O_2$ cathode with improved rate capability", Journal of Materials Chemistry, vol. 19, No. 28, XP 55016651, Jan. 1, 2009, pp. 4965-4972.
Y. Wu, et al., "Surface Modification of High Capacity Layered $Li[Li_{0.2}Mn_{0.54}Ni_{0.13}]O_2$ Cathodes by $AlPO_4$", Journal of the Electrochemical Society, vol. 155, No. 9, XP 002667286, Jul. 11, 2008, pp. A635-A641.
U.S. Appl. No. 13/824,097, filed Mar. 15, 2013, Schulz-Dobrick, et al.
U.S. Appl. No. 13/764,936, filed Feb. 12, 2013, Volkov, et al.
Combined Chinese Office Action and Search Report issued Jun. 16, 2014 in Patent Application No. 201180055691.X (with partial English translation and English translation of categories of cited documents).

* cited by examiner

*Primary Examiner* — Monique Peets
(74) *Attorney, Agent, or Firm* — Oblon, McClelland, Maier & Neustadt, L.L.P.

(57) ABSTRACT

A process for producing electrode materials, which comprises treating a mixed oxide which comprises lithium and at least one transition metal as cations with at least one oxygen-containing organic compound of sulfur or phosphorus or a corresponding alkali metal or ammonium salt of an oxygen-containing organic compound of sulfur or phosphorus, or a fully alkylated derivative of an oxygen-containing compound of sulfur or phosphorus.

8 Claims, No Drawings

PROCESS FOR PRODUCING ELECTRODE MATERIALS

CROSS REFERENCE TO RELATED APPLICATION

This application claims the benefit of U.S. provisional application No. 61/384,725, filed on Sep. 21, 2010.

The present invention relates to a process for producing electrode materials, which comprises treating a mixed oxide which comprises lithium and at least one transition metal as cations with at least one oxygen-containing organic compound of sulfur or phosphorus or a corresponding alkali metal or ammonium salt of an oxygen-containing organic compound of sulfur or phosphorus, or a fully alkylated derivative of an oxygen-containing compound of sulfur or phosphorus.

The present invention further relates to electrode materials which are obtainable by the process according to the invention, and to the use thereof in or for production of electrochemical cells. The present invention further relates to electrochemical cells comprising at least one inventive electrode material.

In the search for advantageous electrode materials for batteries which utilize lithium ions as conductive species, numerous materials have been proposed to date, for example lithium-containing spinels, mixed oxides, for example lithiated nickel-manganese-cobalt oxides and lithium-iron phosphates. Particular attention is being dedicated to the mixed oxides at present.

In order to improve the energy density of the electrochemical cells based on such electrodes, which are generally quite heavy, there is a constant search for improved electrode materials with improved charging/discharging performance.

Furthermore, there is an interest in cathode materials which enable very stable electrochemical cells. For this purpose, the cathode materials should react to a minimum degree with the electrolyte and especially with the solvents used, since compounds which form in the reaction can hinder ion conductivity in the cells, which has adverse effects on the long-term stability of the electrochemical cells.

US 2009/0286157 proposes a process for surface modification of electrodes for lithium ion batteries, by which the evolution of gas in the course of operation of a lithium ion battery can be reduced. The process for surface modification is based on reaction of electrode materials with silanes or organometallic compounds. However, many of the silanes proposed and of the organometallic compounds are laborious to produce and difficult to handle.

Accordingly, the process defined at the outset has been found, also referred to as "process according to the invention" for short.

In the context of the present invention, organic sulfur compounds defined at the outset are also referred to as "organic sulfur compound" for short, and organic phosphorus compounds defined at the outset as "organic phosphorus compound" for short.

The process according to the invention proceeds from a mixed oxide which comprises lithium and at least one transition metal, preferably at least two and more preferably at least three different transition metals, as cations.

The mixed oxide preferably comprises not more than 10, more preferably not more than 5, different transition metals as cations.

The phrase "comprises as cations" shall be understood to mean those cations which are present not merely as traces in the mixed oxide used in accordance with the invention, but in proportions of at least 1% by weight, based on the total metal content of the mixed oxide in question, preferably in proportions of at least 2% by weight and more preferably in proportions of at least 5% by weight.

In one embodiment of the present invention, the mixed oxide comprises three different transition metals as cations.

In one embodiment of the present invention, lithium may be replaced to an extent of up to 5 mol % by one or more other alkali metals or by magnesium. Lithium is preferably replaced to an extent of less than 0.5 mol % by other alkali metals or by magnesium.

In one embodiment of the present invention, lithium may be replaced to an extent of at least 10 mol-ppm by at least one other alkali metal or magnesium.

In one embodiment of the present invention, mixed oxide is present in particulate form, for example in the form of particles having a mean diameter in the range from 10 nm to 100 μm. In this context, particles may comprise primary particles and secondary particles. In one embodiment of the present invention, primary particles of mixed oxide may have a mean diameter in the range from 10 nm to 950 nm, and secondary particles a mean diameter in the range from 1 μm to 100 μm.

In one embodiment of the present invention, transition metals, which may also be referred to as "M" in the context of the present invention, are selected from groups 3 to 12 of the Periodic Table of the Elements, for example Ti, V, Cr, Mn, Fe, Co, Ni, Zn or Mo, preference being given to Mn, Co and Ni.

In one embodiment of the present invention, mixed oxides are selected from compounds of the general formula (I)

$$Li_zM_xO_y \qquad (I)$$

in which the variables are each selected as follows:

M is one or more metals of groups 3 to 12 of the Periodic Table of the Elements, for example Ti, V, Cr, Mn, Fe, Co, Ni, Zn, Mo, preference being given to Mn, Co and Ni, x is in the range from 1 to 2, y is in the range from 2 to 4, z is in the range from 0.5 to 1.5.

In one embodiment of the present invention, mixed oxides are selected from compounds of the general formula (I a) or (I b)

$$Li_{1+t}M_{1-t}O_2 \qquad (I\ a)$$

$$Li_{1+t}M_{2-t}O_{4-a} \qquad (I\ b)$$

where a is in the range from zero to 0.4, where t is in the range from zero to 0.4, and the other variables are each selected as specified above.

In one embodiment, M is selected from $Ni_{0.25}Mn_{0.75}$. This variant is preferred especially when mixed oxide is selected from compounds of the formula (I b).

In one embodiment of the present invention, M is selected from $Ni_{0.33}Mn_{0.33}Co_{0.33}$, $Ni_{0.5}Mn_{0.3}Co_{0.2}$, $Ni_{0.4}Mn_{0.2}Cu_{0.4}$, $Ni_{0.22}Mn_{0.66}Co_{0.12}$, $Ni_{0.4}Co_{0.3}Mn_{0.3}$, $Ni_{0.45}Co_{0.1}Mn_{0.45}$, $Ni_{0.4}Co_{0.1}Mn_{0.5}$ and $Ni_{0.5}Co_{0.1}Mn_{0.4}$.

In one embodiment of the present invention, up to 10% by weight of metal of groups 3 to 12 of the Periodic Table of the Elements is replaced by Al, for example 0.5 to 10% by weight. In another embodiment of the present invention, M is not replaced in measurable proportions by Al.

In one embodiment of the present invention, mixed oxide may be doped or contaminated by one or more further metal cations, for example by alkaline earth metal cations, especially by $Mg^{2+}$ or $Ca^{2+}$.

M may be present, for example, in the +2 oxidation state up to the maximum possible oxidation state, in the case of Mn preferably in the +2 to +4 oxidation state, and in the case of Co or Fe preferably in the +2 to +3 oxidation state.

In one embodiment of the present invention, mixed oxide may comprise in the range from 10 ppm up to 5% by weight, based on overall mixed oxide, of anions which are not oxide ions, for example phosphate, silicate and especially sulfate.

According to the invention, treatment is effected with at least one oxygen-containing organic compound of sulfur or phosphorus, i.e. with at least one sulfur or phosphorus compound which has at least one organic radical which can be bonded directly to sulfur or phosphorus or is bonded to sulfur or phosphorus via one or more other atoms, preferably via an oxygen atom. In addition, oxygen-containing organic compounds of sulfur or phosphorus may have one or more acidic groups which may be present as the acid itself or as the corresponding alkali metal or ammonium salt.

In one embodiment of the present invention, treatment is effected with at least one compound of the general formula $O_2S(OR^1)_2$, $O_2SR^2(OR^1)$, $O_2S(R^1)_2$, $OS(OR^1)_2$, $OSR^2(OR^1)$, $OS(R^1)_2$, $S(OR^1)_2$, $SR^2(OR^1)$, $O_2S(OR^1)OH$, $O_2SR^2(OH)$, $OS(OR^1)OH$ or $OSR^2(OH)$, or with a corresponding alkali metal salt or ammonium salt thereof. Alkali metal salts include potassium salts and especially sodium salts. Ammonium salts include salts of suitable amines, for example of $C_1$-$C_4$-alkylamine, di-$C_1$-$C_4$-alkylamine and tri-$C_1$-$C_4$-alkylamine, where alkyl groups in di-$C_1$-$C_4$-alkylamines and tri-$C_1$-$C_4$-alkylamines may be different or preferably the same. Also suitable are salts of alkanolamine, especially ethanolamine, for example ethanolamine, N,N-diethanolamine, N,N,N-triethanolamine, N-methylethanolamine, N,N-dimethylethanolamine, N-methyldiethanolamine and N-n-butylethanolamine.

The variables therein are each independently defined as follows:

$R^1$ is different or preferably—if possible—the same and is selected from $C_1$-$C_6$-alkyl, for example methyl, ethyl, n-propyl, isopropyl, n-butyl, isobutyl, sec-butyl, tert-butyl, n-pentyl, isoamyl, isopentyl, n-hexyl, isohexyl and 1,3-dimethylbutyl, preferably n-$C_1$-$C_6$-alkyl, more preferably methyl, ethyl, n-propyl, isopropyl, and most preferably methyl or ethyl.

$R^2$ is selected from phenyl and preferably $C_1$-$C_6$-alkyl, preferably methyl, ethyl, n-propyl, isopropyl, n-butyl, isobutyl, sec-butyl, tert-butyl, n-pentyl, isoamyl, isopentyl, n-hexyl, isohexyl and 1,3-dimethylbutyl, preferably n-$C_1$-$C_6$-alkyl, more preferably methyl, ethyl, n-propyl, isopropyl, and most preferably methyl or ethyl.

In one embodiment of the present invention, treatment is effected with at least one compound of the general formula $O{=}P(OR^1)_3$, $O{=}P(OH)(OR^1)_2$, $O{=}P(OH)_2(OR^1)$, $O{=}PR^3(OR^1)_2$, $O{=}PR^3(OH)(OR^1)$, $O{=}P(R^3)_2(OR^1)$, $O{=}P(R^3)_2(OH)$, $O{=}P(R^3)_3P(OR^1)_3$, $P(OH)(OR^1)_2$, $P(OH)_2(OR^1)$, $PR^3(OR^1)_2$, $PR^3(OH)(OR^1)$ or $P(R^3)_2(OH)$.

In one embodiment of the present invention, fully alkylated derivatives of an oxygen-containing compound of phosphorus are selected from compounds of the general formula $O{=}P(OR^1)_3$ and dialkyl alkylphosphonates of the general formula $R^3{-}P(O)(OR^1)_2$, in alternative notation $O{=}PR^3(OR^1)_2$, where the variables are each defined as follows:

$R^1$ are different or preferably the same and are selected from $C_1$-$C_6$-alkyl as defined above, and $R^3$ are different or preferably the same and are selected from hydrogen, phenyl and $C_1$-$C_4$-alkyl, preferably methyl or ethyl.

Preferably, in the compound of the formula $O{=}PR^3(OR^1)_2$ $R^1$ and $R^3$ are each the same and are selected from methyl and ethyl.

The process according to the invention can be performed in the gas phase or in the liquid (condensed) phase. A treatment in the gas phase is understood to mean that organic sulfur compound(s) or organic phosphorus compound(s) are present predominantly, i.e. to an extent of at least 50 mol %, in the gaseous state. The mixed oxide(s) are of course not present in the gas phase in the course of performance of the process according to the invention.

A treatment in the liquid phase is understood to mean that the organic sulfur compound(s) or organic phosphorus compound(s) are used in dissolved, emulsified or suspended form or, if they are liquid at the treatment temperature, in substance. The mixed oxide(s) is/are in solid form in the course of performance of the process according to the invention.

In one embodiment of the present invention, mixed oxide is treated with organic sulfur compound(s) or with organic phosphorus compound(s) at temperatures in the range from −20 to +1000° C., preferably +20 to +900° C.

In one embodiment of the present invention, mixed oxide is treated with organic sulfur compound(s) or with organic phosphorus compound(s) in the presence of a solvent or dispersant. Suitable solvents are, for example, aliphatic or aromatic hydrocarbons, organic carbonates, and also ethers, acetals, ketals and aprotic amides, ketones and alcohols. Examples include: n-heptane, n-decane, decahydronaphthalene, cyclohexane, toluene, ethyl-benzene, ortho-, meta- and para-xylene, dimethyl carbonate, diethyl carbonate, methyl ethyl carbonate, ethylene carbonate, propylene carbonate, diethyl ether, diisopropyl ether, di-n-butyl ether, methyl tert-butyl ether, 1,2-dimethoxyethane, 1,1-dimethoxyethane, 1,2-diethoxyethane, 1,1-diethoxyethane, tetrahydrofuran (THF), 1,4-dioxane, 1,3-dioxolane, N,N-dimethylformamide, N,N-dimethylacetamide and N-methylpyrrolidone, acetone, methyl ethyl ketone, cyclohexanone, methanol, ethanol and isopropanol.

In one embodiment of the present invention, organic sulfur compound(s) or organic phosphorus compound(s) is/are used in gaseous form, for example in pure form or with a carrier gas. Suitable carrier gases are, for example, nitrogen, noble gases, for example argon, and also oxygen or air.

In one embodiment of the present invention, 1 to 99% by volume of carrier gas and 99 to 1% by volume of gaseous organic sulfur compound/organic sulfur compounds or organic phosphorus compound/organic phosphorus compounds are employed, preferably 5 to 95% by volume of carrier gas and 95 to 5% by volume of gaseous organic sulfur compound/organic sulfur compounds or organic phosphorus compound/organic phosphorus compounds.

In one embodiment of the present invention, the process according to the invention is performed at standard pressure.

In another embodiment of the present invention, the process according to the invention is performed at elevated pressure, for example at 1.1 to 20 bar.

In another embodiment of the present invention, the process according to the invention is performed at reduced pressure, for example at 0.5 to 900 mbar, especially at 5 to 500 mbar.

In one embodiment of the present invention, the process according to the invention can be performed over a period in the range from 1 minute up to 24 hours, preferably in the range from 10 minutes to 3 hours.

In one embodiment of the present invention, a weight ratio of mixed oxide to organic sulfur compound(s) or organic phosphorus compound(s) in a ratio of 0.01:1 to 1000:1 is selected.

In one embodiment of the present invention, mixed oxide is treated with an organic sulfur compound or an organic phosphorus compound. In another embodiment, mixed oxide is treated with two different organic sulfur compounds or with two different organic phosphorus compounds or with an organic sulfur compound and an organic phosphorus compound, for example simultaneously or successively.

Of course, it is possible in accordance with the invention to treat not only one mixed oxide, but also mixtures of two or more mixed oxides.

In one embodiment of the present invention, mixed oxide is treated in a late phase or toward the end of the step of formation of the mixed oxide, for example from hydroxides, basic oxides or carbonates.

In one embodiment of the present invention, the inventive treatment of mixed oxide with organic sulfur compound or organic phosphorus compound is performed in a rotary tube furnace, a pendulum reactor, a muffle furnace or a push-through furnace.

In one embodiment of the present invention, a push-through furnace or pendulum or rotary tube furnace which has several sections is used, and a gas stream which comprises organic sulfur compound(s) or organic phosphorus compound(s) is introduced in at least one section, for example in the last section. The last section refers to that section through which the material to be heated passes last, before it leaves the furnace.

After the actual treatment with sulfur or phosphorus compound, unconverted organic sulfur compound(s) or unconverted organic phosphorus compound(s), any by-products and any solvent used can be removed.

When the treatment of mixed oxide with organic sulfur compound or organic phosphorus compound has been carried out in the gas phase, it is possible, for example, to remove unconverted organic sulfur compound(s) or unconverted organic phosphorus compound(s) and any by-products by purging with inert gas, by evacuating or by baking out, optionally under reduced pressure.

When the treatment of mixed oxide with organic sulfur compound(s) or organic phosphorus compound(s) has been performed in the liquid phase in the presence of solvent, for example, unconverted organic sulfur compound(s) or unconverted organic phosphorus compound(s) and solvent can be removed by filtration, extractive washing, distillative removal of solvent, evaporation of organic sulfur compound(s) or organic phosphorus compound(s) and/or solvent or extraction, or by a combination of one or more of the aforementioned measures.

Subsequently, mixed oxide treated in accordance with the invention can be thermally aftertreated, for example at 100° C. to 1000° C., preferably 200° C. to 600° C. A thermal aftertreatment can be performed under air or inert carrier gas.

In one embodiment of the present invention, a pendulum furnace, a push-through furnace or a rotary tube furnace is selected for the thermal aftertreatment.

In one embodiment of the present invention, the thermal aftertreatment is performed over a period in the range from one minute to 24 hours, preferably 30 minutes to 4 hours.

In one embodiment of the present invention, the procedure is to treat mixed oxide in a mixture with at least one further constituent of electrodes, together with at least one organic sulfur compound or at least one organic phosphorus compound, constituents of electrodes being selected from carbon, a precursor for carbon and polymeric binder.

In another embodiment of the present invention, the procedure is to treat mixed oxide alone with at least one organic sulfur compound or at least one organic phosphorus compound, i.e. in the absence of carbon, a precursor for carbon and polymeric binder.

Materials produced by the process according to the invention are very suitable as an electrode material. The present application therefore further provides electrode materials produced by the process according to the invention. They have not only the positive properties of the parent mixed oxides, but also have very good free flow and can therefore be processed in an excellent manner to give electrodes.

The present invention further provides electrode materials comprising at least one mixed oxide of the general formula (I)

$$Li_zM_xO_y \quad \text{(I)}$$

in which the variables are each selected as follows:

M is one or more metals of groups 3 to 12 of the Periodic Table of the Elements, for example Ti, V, Cr, Mn, Fe, Co, Ni, Zn or Mo, preference being given to Mn, Co and Ni, x is in the range from 1 to 2, y is in the range from 2 to 4, z is in the range from 0.5 to 1.5, modified within the range from 0.02 to 1% by weight, preferably to 0.2% by weight, based on the mixed oxide, of phosphorus in the +3 or +5 oxidation state, also referred to in the context of the present invention as "inventive modified mixed oxide" for short.

In one embodiment of the present invention, mixed oxides are selected from compounds of the general formula (I a) or (I b)

$$Li_{1+t}M_{1-t}O_2 \quad \text{(I a)}$$

$$Li_{1+t}M_{2-t}O_{4-a} \quad \text{(I b)}$$

where a is in the range from zero to 0.4, where t is in the range from zero to 0.4, and the other variables are each selected as specified above.

Without wishing to commit to a theory, it can be assumed that mixed oxide can be doped with phosphorus in the +3 or preferably +5 oxidation state or with sulfur in the +6 oxidation state, which means that phosphorus or sulfur assumes transition metal sites in the crystal lattice, or—in another variant—that phosphorus or sulfur has formed a compound with one or more metals of groups 3 to 12 of the Periodic Table of the Elements.

In one embodiment of the present invention, inventive electrode material has layer or spinel structure.

In one embodiment, M is selected from $Ni_{0.25}Mn_{0.75}$. This variant is preferred especially when mixed oxide is selected from compounds of the formula (I b).

In one embodiment of the present invention, M is selected from $Ni_{0.33}Mn_{0.33}Cu_{0.33}$, $Ni_{0.5}Mn_{0.3}Co_{0.2}$, $Ni_{0.4}Mn_{0.2}Co_{0.4}$, $Ni_{0.22}Mn_{0.66}Co_{0.12}$, $Ni_{0.4}Co_{0.3}Mn_{0.3}$, $Ni_{0.45}Co_{0.1}Mn_{0.45}$, $Ni_{0.4}Co_{0.1}Mn_{0.5}$ and $Ni_{0.5}Co_{0.1}Mn_{0.4}$.

In one embodiment of the present invention, up to 10% by weight of metal of groups 3 to 12 of the Periodic Table of the Elements is replaced by Al, for example 0.5 to 10% by weight. In another embodiment of the present invention, M is not replaced in measurable proportions by Al.

In one embodiment of the present invention, up to 5% by weight of oxygen in the compound of the formula (I) is replaced by F. In another embodiment of the present invention, no measurable proportions of oxygen are replaced by F.

Inventive electrode materials can be obtained, for example, by the process according to the invention.

In one embodiment of the present invention, the modification in inventive electrode materials, i.e. the modification with phosphorus in the +3 or preferably +5 oxidation state or with sulfur in the +6 oxidation state, is distributed homogeneously over the surface of the electrode material. This is understood to mean that phosphorus atoms or boron atoms are distributed not only on the outer surface but also in the pores of particles of mixed oxide.

In one embodiment of the present invention, the modification with phosphorus in the +3 or preferably +5 oxidation state or with sulfur in the +6 oxidation state, furthermore, is so homogeneous that the concentration preferably does not deviate by more than ±20 mol %, measured at the surface of particles of mixed oxide, preferably not by not more than ±10 mol %.

Inventive electrode materials have very good processibility, for example owing to their good free flow, and exhibit very good cycling stability when electrochemical cells are produced using inventive modified mixed oxide.

Inventive electrode material may further comprise carbon in an electrically conductive polymorph, for example in the form of carbon black, graphite, graphene, carbon nanotubes or activated carbon.

Inventive electrode material may further comprise at least one binder, for example a polymeric binder.

Suitable binders are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylate are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have a mean molecular weight $M_w$ in the range from 50 000 to 1 000 000 g/mol, preferably to 500 000 g/mol.

Binders may be crosslinked or uncrosslinked (co)polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule.

Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Electrically conductive, carbon-containing material can be selected, for example, from graphite, carbon black, carbon nanotubes, graphene or mixtures of at least two of the aforementioned substances. In the context of the present invention, electrically conductive, carbon-containing material can also be referred to as carbon (B) for short.

In one embodiment of the present invention, electrically conductive, carbon-containing material is carbon black. Carbon black may, for example, be selected from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

In one variant, electrically conductive, carbon-containing material is partially oxidized carbon black.

In one embodiment of the present invention, electrically conductive, carbon-containing material comprises carbon nanotubes. Carbon nanotubes (CNTs for short), for example single-wall carbon nanotubes, SW CNTs) and preferably multiwall carbon nanotubes (MW CNTs), are known per se.

A process for production thereof and some properties are described, for example, by A. Jess et al. in *Chemie Ingenieur Technik* 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

Carbon nanotubes can be prepared by processes known per se. For example, a volatile carbon compound, for example methane or carbon monoxide, acetylene or ethylene, or a mixture of volatile carbon compounds, for example synthesis gas, can be decomposed in the presence of one or more reducing agents, for example hydrogen and/or a further gas, for example nitrogen. Another suitable gas mixture is a mixture of carbon monoxide with ethylene. Suitable temperatures for decomposition are, for example, in the range from 400 to 1000° C., preferably 500 to 800° C. Suitable pressure conditions for the decomposition are, for example, in the range from standard pressure to 100 bar, preferably to 10 bar.

Single- or multiwall carbon nanotubes can be obtained, for example, by decomposition of carbon-containing compounds in a light arc, specifically in the presence or absence of a decomposition catalyst.

In one embodiment, the decomposition of volatile carbon-containing compound or carbon-containing compounds is performed in the presence of a decomposition catalyst, for example Fe, Co or preferably Ni.

In the context of the present invention, graphene is understood to mean almost ideally or ideally two-dimensional hexagonal carbon crystals with a structure analogous to single graphite layers.

In one embodiment of the present invention, the weight ratio of compound of the general formula (I) and electrically conductive, carbon-containing material is in the range from 200:1 to 5:1, preferably 100:1 to 10:1.

A further aspect of the present invention is an electrode comprising at least one compound of the general formula (I), at least one electrically conductive, carbon-containing material and at least one binder.

Compound of the general formula (I) and electrically conductive, carbon-containing material have been described above.

The present invention further provides electrochemical cells produced using at least one inventive electrode. The present invention further provides electrochemical cells comprising at least one inventive electrode.

In one embodiment of the present invention, inventive electrode material comprises:

in the range from 60 to 98% by weight, preferably 70 to 96% by weight, of inventive modified mixed oxide, in the range from 1 to 20% by weight, preferably 2 to 15% by weight, of binder, in the range from 1 to 25% by weight, preferably 2 to 20% by weight, of electrically conductive, carbon-containing material.

The geometry of inventive electrodes can be selected within wide limits. It is preferred to configure inventive electrodes in thin films, for example in films with a thickness in the range from 10 μm to 250 μm, preferably 20 to 130 μm.

In one embodiment of the present invention, inventive electrodes comprise a foil, for example a metal foil, especially an aluminum foil, or a polymer film, for example a polyester film, which may be untreated or siliconized.

The present invention further provides for the use of inventive electrode materials or inventive electrodes in electrochemical cells. The present invention further provides a process for producing electrochemical cells using inventive electrode material or inventive electrodes. The present invention further provides electrochemical cells comprising at least one inventive electrode material or at least one inventive electrode.

By definition, inventive electrodes in inventive electrochemical cells serve as cathodes. Inventive electrochemical cells comprise a counter-electrode, which is defined as the anode in the context of the present invention, and which may, for example, be a carbon anode, especially a graphite anode, a lithium anode, a silicon anode or a lithium titanate anode.

Inventive electrochemical cells may, for example, be batteries or accumulators.

Inventive electrochemical cells may comprise, in addition to the anode and inventive electrode, further constituents, for example conductive salt, nonaqueous solvent, separator, output conductor, for example made from a metal or an alloy, and also cable connections and housing.

In one embodiment of the present invention, inventive electrical cells comprise at least one nonaqueous solvent which may be liquid or solid at room temperature, preferably selected from polymers, cyclic or noncyclic ethers, cyclic and noncyclic acetals and cyclic or noncyclic organic carbonates.

Examples of suitable polymers are especially polyalkylene glycols, preferably poly-$C_1$-$C_4$-alkylene glycols and especially polyethylene glycols. These polyethylene glycols may comprise up to 20 mol % of one or more $C_1$-$C_4$-alkylene glycols in copolymerized form. The polyalkylene glycols are preferably polyalkylene glycols double-capped by methyl or ethyl.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (II) and (III)

(II)

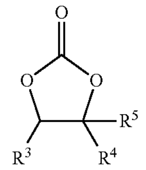

-continued (III)

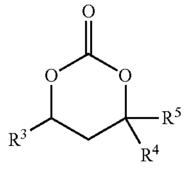

in which $R^3$, $R^4$ and $R^5$ may be the same or different and are selected from hydrogen and $C_1$-$C_4$-alkyl, for example methyl, ethyl, n-propyl, isopropyl, n-butyl, isobutyl, sec-butyl and tert-butyl, where $R^4$ and $R^5$ are preferably not both tert-butyl.

In particularly preferred embodiments, $R^3$ is methyl and $R^4$ and $R^5$ are each hydrogen, or $R^3$, $R^4$ and $R^5$ are each hydrogen.

Another preferred cyclic organic carbonate is vinylene carbonate, formula (IV).

(IV)

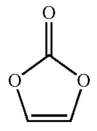

The solvent(s) is (are) preferably used in what is known as the anhydrous state, i.e. with a water content in the range from 1 ppm to 0.1% by weight, determinable, for example, by Karl Fischer titration.

Inventive electrochemical cells further comprise one or more conductive salts. Suitable conductive salts are especially lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_mYLi$, where m is defined as follows:

m=1 when Y is selected from oxygen and sulfur, m=2 when Y is selected from nitrogen and phosphorus, and m=3 when Y is selected from carbon and silicon.

Preferred conductive salts are selected from $LiC(CF_3SO_2)_3$, $LiN(CF_3SO_2)_2$, $LiPF_6$, $LiBF_4$, $LiClO_4$, particular preference being given to $LiPF_6$ and $LiN(CF_3SO_2)_2$.

In one embodiment of the present invention, inventive electrochemical cells comprise one or more separators by which the electrodes are mechanically separated. Suitable separators are polymer films, especially porous polymer films, which are unreactive toward metallic lithium. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, separators may be selected from PET nonwovens filled with inorganic particles. Such separators may have a porosity in the range from 40 to 55%. Suitable pore diameters are, for example, in the range from 80 to 750 nm.

Inventive electrochemical cells further comprise a housing which may have any desired shape, for example cuboidal or the shape of a cylindrical disk. In one variant, the housing used is a metal foil elaborated as a pouch.

Inventive electrochemical cells give a high voltage and are notable for a high energy density and good stability.

Inventive electrochemical cells can be combined with one another, for example in series connection or in parallel connection. Series connection is preferred.

The present invention further provides for the use of inventive electrochemical cells in units, especially in mobile units. Examples of mobile units are motor vehicles, for example automobiles, motorcycles, aircraft, or water vehicles such as boats or ships. Other examples of mobile units are those which are moved manually, for example computers, especially laptops, phones, or electrical hand tools, for example from the building sector, especially drills, battery-powered drills or battery-powered tackers.

The use of inventive electrochemical cells in units gives the advantage of a longer run time before recharging. If it were desired to achieve the same run time with electrochemical cells with lower energy density, a higher weight would have to be accepted for electrochemical cells.

The invention is illustrated by working examples.

I. Treatment with Phosphorus Compounds

I.1 Treatment of mixed oxide I.1 with phosphorus compound (P-1)

10 g of $LiNi_{0.5}Mn_{1.5}O_4$ with spinel structure were suspended in 10 g of triethyl phosphate $O{=}P(OC_2H_5)_3$ (P-1). The suspension thus obtained was stirred under nitrogen at 60° C. for 1 hour. The suspension was then filtered through a glass frit. The treated mixed oxide thus obtainable was then calcined under nitrogen in a rotary tube furnace at 160° C. for 1 hour and then at 500° C. for 3 hours. This gave a mixed oxide MOx-1 treated in accordance with the invention. The phosphorus content of the inventive treated mixed oxide was determined to be 0.030% by weight. An X-ray diffractogram showed that the spinel structure had been preserved.

I.2 Treatment of Mixed Oxide I.1 with Phosphorus Compound (P-1)

10 g of $LiNi_{0.5}Mn_{1.5}O_4$ with spinel structure were suspended in 10 g of triethyl phosphate $O{=}P(OC_2H_5)_3$ (P-1). The suspension thus obtained was stirred under nitrogen at 60° C. for 1 hour. The suspension was then concentrated to dryness with the aid of a rotary evaporator at a pressure of about 2 mbar and a heating bath temperature of 110° C. The residue thus obtainable was then calcined under nitrogen in a rotary tube furnace at 160° C. for 1 hour and then at 500° C. for 3 hours. This gave mixed oxide MOx-1' treated in accordance with the invention. The phosphorus content of the inventive treated mixed oxide MOx-1' was determined to be 0.022% by weight. An X-ray diffractogram showed that the spinel structure had been preserved.

I.3 Treatment of Mixed Oxide 1.1 with Phosphorus Compound (P-1)

10 g of $LiNi_{0.5}Mn_{1.5}O_4$ with spinel structure were suspended in 10 g of triethyl phosphate $O{=}P(OC_2H_5)_3$ (P-1). The suspension thus obtained was stirred under nitrogen at 60° C. for 1 hour. The suspension was then filtered through a glass frit. Thereafter, the residue thus obtainable was calcined under air in a muffle furnace at 300° C. for 1 hour. This gave mixed oxide MOx-1" treated in accordance with the invention. The phosphorus content of the inventive treated mixed oxide MOx-1" was determined to be 0.050% by weight. An X-ray diffractogram showed that the spinel structure had been preserved.

I.4 Treatment of Mixed Oxide 1.2 with Phosphorus Compound (P-1)

10 g of $Li(Li_{0.20}Ni_{0.17}Co_{0.10}Mn_{0.53})O_2$ with layer structure were suspended in 10 g of triethyl phosphate O=P$(OC_2H_5)_3$ (P-1). The suspension thus obtained was stirred under nitrogen at 60° C. for 1 hour. The suspension was then filtered through a glass frit. Thereafter, the residue thus obtainable was calcined under air in a muffle furnace at 300° C. for 1 hour. This gave mixed oxide MOx-2 treated in accordance with the invention. The phosphorus content of the inventive treated mixed oxide MOx-2 was determined to be 0.130% by weight. An X-ray diffractogram showed that the layer structure had been preserved.

I.5 Treatment of Mixed Oxide 1.1 with Phosphorus Compound (P-1)

10 g of $LiNi_{0.5}Mn_{1.5}O_4$ with spinel structure were suspended in a solution of 0.5 g of triethyl phosphate O=$(OC_2H_5)_3$ (B-1) in 12 g of ethanol. The suspension thus obtained was stirred under nitrogen at 60° C. for 1 hour. The suspension was then concentrated to dryness with the aid of a rotary evaporator at a heating bath temperature of 70° C. and a pressure of at first 250 mbar, then later 10 mbar. The residue thus obtainable was then calcined in a rotary tube furnace under nitrogen at 300° C. for 1 hour and at 500° C. for 3 hours. This gave mixed oxide MOx-1''' treated in accordance with the invention. The phosphorus content of the inventive treated mixed oxide MOx-1''' was determined to be 0.10% by weight. An X-ray diffractogram showed that the spinel structure had been preserved.

I.6 Treatment of Mixed Oxide 1.1 with Phosphorus Compound (P-2)

25 g of $LiNi_{0.5}Mn_{1.5}O_4$ with spinel structure were introduced into a 2 l glass rotary sphere which had an inlet and, in the 180° position, an outlet. This was purged with dry nitrogen at room temperature for 30 minutes and then heated to 120° C. within 10 minutes. Then it was rotated at 5 revolutions per minute. A gas stream which comprised 5% by volume of O=P$(CH_3)(OCH_3)_2$ (P-2), based on the gas stream, was pumped through the rotary sphere for 1 hour. The gas flow was adjusted such that 10 standard liters of gas/h flowed through. Thereafter, the powder thus obtainable was cooled to room temperature and transferred to a forced-air oven. This was followed by thermal heating to 300° C. in a forced-air oven under air within 30 minutes, and thermal treatment at 300° C. for 2 hours. This gave mixed oxide MOx-1.1'''' treated in accordance with the invention. The phosphorus content of the inventive treated mixed oxide MOx-1'''' was determined to be 0.04% by weight. An X-ray diffractogram showed that the spinel structure had been preserved.

II. General Method for Production of Electrodes and Test Cells

Materials Used:

Electrically Conductive, Carbon-Containing Materials:

Carbon (C-1): carbon black, BET surface area of 62 $m^2/g$, commercially available as "Super P Li" from Timcal.

Binder (BM.1): copolymer of vinylidene fluoride and hexafluoropropene, in powder form, commercially available as Kynar Flex® 2801 from Arkema, Inc.

Figures in % are based on % by weight, unless explicitly stated otherwise.

To determine the electrochemical data of the materials, 8 g of inventive mixed oxide MOx-1, 1 g of carbon (C-1) and 1 g of (BM.1), with addition of 24 g of N-methylpyrrolidone (NMP), were mixed to give a paste.

A 30 μm-thick aluminum foil was coated with the above-described paste (active material loading 5-7 mg/$cm^2$). After drying at 105° C., circular parts of the aluminum foil thus coated (diameter 20 mm) were punched out. The electrodes thus obtainable were used to produce electrochemical cells.

After drying at 105° C., circular electrodes (diameter 20 mm) were punched out and built into test cells. The electrolyte used was a 1 mol/l solution of $LiPF_6$ in ethylene carbonate/dimethyl carbonate (1:1 based on parts by mass). The anode of the test cells consisted of a lithium foil which was in contact with the cathode foil via a separator made from glass fiber paper.

This gave inventive electrochemical cells EZ.1.

Inventive electrochemical cell EZ.6 was manufactured as follows:

Test cells were manufactured with cathode materials made from the mixed oxide MOx-1.1'''' treated in accordance with the invention (example 1.6), which had been triturated analogously to II. with carbon (C-1) and with polymeric binder (BM.1). As a comparison, a comparative cell was manufactured in an analogous manner with an unmodified $LiNi_{0.5}Mn_{1.5}O_4$ with spinel structure.

Testing of Inventive Electrochemical Cells:

Inventive electrochemical cells EZ.6 were subjected to cycling (charging/discharging) between 4.9 V and 3.5 Vat 25° C. in 100 cycles. The charging and discharging currents were 150 mA/g of cathode material. The retention of the discharge capacity after 100 cycles was determined.

EZ.6: 98.0%

Comparative Example: 96.0%

Inventive electrochemical cells show an advantage in cycling stability.

The cells were subjected to cycling (charging/discharging) between 4.9 V and 3.5 V at 25° C. in 100 cycles. The charging and discharging currents were 150 mA/g of cathode material. The retention of the discharge capacity after 100 cycles was determined.

The invention claim is:

1. A process for producing an electrode material, which comprises treating a mixed oxide which comprises lithium and at least one transition metal as cations with at least one fully alkylated derivative of an oxygen-containing compound of sulfur or phosphorus, optionally in the presence of a solvent, and removing solvent and unconverted oxygen-containing compound of sulfur or phosphorous to provide said electrode material.

2. The process according to claim 1, wherein the oxygen-containing compound of phosphorus or sulfur in a liquid phase or in a gas phase, is allowed to act on mixed oxide which comprises lithium and at least one transition metal as cations.

3. The process according to claim 1, wherein mixed oxide is treated in a mixture together with at least one further constituent of electrodes, constituents of electrodes being selected from carbon and polymeric binder.

4. The process according to claim 1, wherein mixed oxide is a compound represented by formula (I)

$$Li_zM_xO_y \quad (I)$$

in which the variables are each selected as follows:

M is one or more metals of groups 3 to 12 of the Periodic Table of the Elements, x is in the range from 1 to 2, y is in the range from 2 to 4, z is in the range from 0.5 to 1.5.

5. The process according to claim 1, wherein fully alkylated derivatives of an oxygen-containing compound of phosphorus are selected from compounds of formula O═P$(OR^1)_3$ and dialkyl alkylphosphonates of formula $R^3$—P(O)$(OR^1)_2$, where the variables are each defined as follows:

$R^1$ is a $C_1$-$C_6$-alkyl, $R^3$ are the same or different and are selected from the group consisting of phenyl and $C_1$-$C_6$-alkyl.

6. The process according to claim 1, wherein fully alkylated derivatives of an oxygen-containing compound of phosphorus are selected from compounds of formula O═P$(OR^1)_3$ and dialkyl alkylphosphonates of formula O═P$R^3$$(OR^1)_2$, where the variables are each defined as follows:

$R^1$ is a $C_1$-$C_6$-alkyl, $R^3$ are the same or different and are selected from the group consisting of phenyl and a $C_1$-$C_6$-alkyl.

7. The process according to claim 1, wherein fully alkylated derivatives of an oxygen-containing compound of phosphorus is a compound of the formula O═P$R^3$$(OR^1)_2$, where $R^1$ and $R^3$ are each the same and are selected from methyl and ethyl.

8. The process of claim 1, further comprising thermally treating said electrode material at a temperature ranging from 100 to 1000° C. after said removing.

* * * * *